(12) United States Patent
Varekamp

(10) Patent No.: US 11,978,187 B2
(45) Date of Patent: May 7, 2024

(54) APPARATUS AND METHOD FOR EVALUATING A QUALITY OF IMAGE CAPTURE OF A SCENE

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

(*) Notice: Subject to any disclaimer, the term of this patent is extended or adjusted under 35 U.S.C. 154(b) by 95 days.

(21) Appl. No.: 17/641,831

(22) PCT Filed: Sep. 8, 2020

(86) PCT No.: PCT/EP2020/075045
§ 371 (c)(1),
(2) Date: Mar. 10, 2022

(87) PCT Pub. No.: WO2021/048107
PCT Pub. Date: Mar. 18, 2021

(65) Prior Publication Data
US 2022/0383476 A1    Dec. 1, 2022

(30) Foreign Application Priority Data

Sep. 12, 2019  (EP) .................................... 19196992

(51) Int. Cl.
*G06T 15/00* (2011.01)
*G06T 7/00* (2017.01)
(Continued)

(52) U.S. Cl.
CPC .............. *G06T 7/0002* (2013.01); *G06T 7/55* (2017.01); *G06T 7/90* (2017.01); *G06T 9/00* (2013.01);
(Continued)

(58) Field of Classification Search
CPC .. G06T 15/10; G06T 7/55; G06T 7/90; G06T 7/0002; G06T 9/00; G06T 2210/56;
(Continued)

(56) References Cited

FOREIGN PATENT DOCUMENTS

| WO | 2019020433 A1 | 1/2019 |
| WO | 2019134979 A1 | 7/2019 |

OTHER PUBLICATIONS

Chen X, Davis J. An occlusion metric for selecting robust camera configurations. Machine Vision and Applications. Jul. 2008;19:217-22.*

(Continued)

*Primary Examiner* — Phu K Nguyen

(57) ABSTRACT

An apparatus for evaluating a quality for image capture comprises a stored (101) for storing a model of a scene and a capture circuit (105) for generating virtual captured images for a camera configuration by rendering from the model. A depth generation circuit (107) generates model depth data from the model and a depth estimation circuit (111) generates estimated depth data from the virtual captured images. A first synthesis circuit (109) and a second synthesis circuit (113) generates first and second view images for test poses by processing the virtual captured images based on the model depth data or estimated depth data respectively. A reference circuit (103) generates reference images for the f test poses by rendering based on the model. A quality circuit (115) generates a quality metric based on a comparison of the first view images, the second view images, and the reference images.

20 Claims, 9 Drawing Sheets

(51) Int. Cl.
*G06T 7/55* (2017.01)
*G06T 7/90* (2017.01)
*G06T 9/00* (2006.01)
*G06T 15/10* (2011.01)

(52) U.S. Cl.
CPC .... *G06T 15/10* (2013.01); *G06T 2207/10024* (2013.01); *G06T 2207/30168* (2013.01); *G06T 2210/56* (2013.01)

(58) Field of Classification Search
CPC ........... G06T 2207/10024; G06T 2207/30168; G01B 11/245; H04N 21/21805; H04N 2013/0081; G01C 11/02
USPC ......................................................... 345/418
See application file for complete search history.

(56) References Cited

OTHER PUBLICATIONS

C. Varekamp. Evaluating the quality of multi-camera video capture and view-point interpolation for 6DoF AR/VR applications. Submitted to IBC2019 as a technical paper. To be presented on Sep. 16, 2019 in Amsterdam.
D. Scharstein et al "A Taxonomy and Evaluation of Dense Two-frame Stereo Correspondence Algorithms" Stereo and Multi-Baseline Vision 2001 p. 131-140.
International Search Report and Written Opinion from PCT/EP2020/075045 dated Nov. 18, 2020.

* cited by examiner

APPARATUS AND METHOD FOR EVALUATING A QUALITY OF IMAGE CAPTURE OF A SCENE

CROSS-REFERENCE TO PRIOR APPLICATIONS

This application is the U.S. National Phase application under 35 U.S.C. § 371 of International Application No. PCT/EP2020/075045, filed on Sep. 8, 2020, which claims the benefit of EP Patent Application No. EP 19196992.2, filed on Sep. 12, 2019. These applications are hereby incorporated by reference herein.

FIELD OF THE INVENTION

The invention relates to an apparatus and method for evaluating a quality for image capture of a scene by a plurality of cameras, such as specifically for video capture of real-life events for virtual reality rendering.

BACKGROUND OF THE INVENTION

The variety and range of image and video applications have increased substantially in recent years with new services and ways of utilizing and consuming images and video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first-person shooters, for computers and consoles.

Another application that is attracting a lot of interest is the provision of views of a real-world scene, and often a real time event, that allow small viewer movements, such as small head movements and rotations. For example, real-time video broadcast of e.g. a sports event that allows local client based generation of views following small head movements of a viewer may provide the impression of a user being seated in the stands watching the sports event. The user can e.g. look around and will have a natural experience similar to the experience of a spectator being present at that position in the stand.

In order to provide such services for a real-world scene, it is required to capture the scene from different positions and thus different camera capture poses are used. However, this tends to require complex and expensive capture processes including often using a plurality of cameras simultaneously. It is therefore desirable to minimize the complexity and resources required for the capture process. However, it is often very difficult to determine the minimum capture setup that will result in the desired performance, and often it requires different capture configurations to be physically implemented and tested in the actual environment.

Recently, there has been an increasing prevalence of display devices with positional tracking and 3D interaction supporting applications based on 3D capturing of real-world scenes. As a result, the relevance and importance of multi-camera capturing and e.g. 6DoF (6 Degrees of Freedom) processing is quickly increasing. Applications include live concerts, live sports, and telepresence. The freedom of selecting one's own viewpoint enriches these applications by increasing the feeling of presence over regular video. Furthermore, immersive scenarios can be conceived where an observer may navigate and interact with a live captured scene. For broadcast applications this may require real-time depth estimation on the production side and real-time view synthesis at the client device. Both depth estimation and view synthesis introduce errors and these errors depend on the implementation details of algorithms. Furthermore, the optimal camera configuration depends on the intended application and the 3D structure of the scene being captured.

Competing methods for 6DoF video capture/creation and compression are often compared visually, and, in the case of compression, also quantitatively. However, the quality is often more determined by the type of camera sensors, their spatial configuration (e.g. spacing), and camera parameters. Comparing such capture configurations is often costly since it involves costly equipment and creating labor intensive setups.

Producing e.g. live 6DoF video requires video capture with multiple cameras, real-time depth estimation, compression, streaming and playback, and in order to make the right choices during development there is a desire to be able to predict in advance the effect that system parameters (e.g. the number of and the distances between cameras) and depth estimation algorithms or other processing have on image quality.

As a result, there is an increasing desire to be able to evaluate various capture configurations and processing, but this is inherently a difficult process which typically is performed by creating experimental setups and evaluating these by using the setups to capture trial events and scenes.

Hence, an improved approach for evaluating quality of capture/camera configurations and/or associated processing would be desirable. In particular, an approach that allows improved operation, increased flexibility, facilitated implementation, facilitated operation, facilitated evaluation, reduced cost, reduced complexity, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for evaluating a quality for image capture, the apparatus comprising: a store for storing a model of a scene; a capture circuit for generating virtual captured images for a plurality of camera poses of a camera configuration, the capture circuit being arranged to generate the virtual captured images by rendering images for the camera poses based on the model; a depth generation circuit for generating model depth data for the virtual captured images from the model; a first synthesis circuit for processing the virtual captured images based on the model depth data to generate first view images for a plurality of test poses in a region of the scene; a depth estimation circuit for generating estimated depth data for the virtual captured images based on the virtual captured images; a second synthesis circuit for processing the virtual captured images based on the estimated depth data to generate second view images for the plurality of test poses; a reference circuit for generating reference images for the plurality of test poses by rendering images for the plurality of test poses based on the model; a quality circuit for generating a quality metric for at least one of the camera configuration, the processing to generate the first view images, and the processing to generate the second view images in response to a comparison of the first view images, the second view images, and the reference images.

The invention may provide an advantageous approach for evaluating the quality of a camera configuration and/or associated processing. It may for example be particularly advantageous for evaluating and/or comparing different camera configurations and/or associated processing without requiring the capture system to be implemented and tested. The approach may allow different capture approaches to be evaluated for a specific application before this is implemented. Thus, design decisions and capture parameters may be evaluated and selected based on the performed analysis.

The consideration of both images for test poses generated by direct rendering without considering the capture images, view images generated based on depth data generated from the model, and view images generated based on estimated depth data may provide particularly advantageous information. It may for example allow a differentiation between errors and artefacts that can be mitigated by improving the depth estimation (whether by adding more camera poses to the camera configuration or by improving the depth mode) and errors and artefacts that cannot be improved by improved depth estimation.

The approach may provide an accurate evaluation of the entire processing path from capture to synthesizing view images for the test poses thereby providing a more accurate evaluation of the resulting quality that can be achieved.

The processing of the first synthesis circuit and the second synthesis circuit may specifically include some or all processing blocks of the distribution path, including encoding and decoding.

In some embodiments, the apparatus may be arranged to generate quality metrics for a plurality of different camera configurations and to select a camera configuration out of the plurality of different camera configurations in response to the quality metrics.

A pose may be a position and/or orientation.

In accordance with an optional feature of the invention, at least one of the processing by the first synthesizing circuit and the second synthesizing circuit includes generating a depth map model for a first virtual capture image of the virtual captured images and view shifting the first virtual capture image to a test pose of the plurality of test poses using the depth map model.

The approach may provide a particularly advantageous evaluation of capture and rendering systems using depth maps for view synthesis.

In accordance with an optional feature of the invention, at least one of the processing by the first synthesizing circuit and the second synthesizing circuit includes determining a set of 3D points using at least one depth model determined from the virtual capture images, determining a color for each 3D point using at least one virtual capture image of the virtual capture images, and synthesizing a new image for a test pose of the plurality of test poses based on a projection of the 3D points.

The approach may provide a particularly advantageous evaluation of capture and rendering systems using 3D point depth representations for view synthesis.

In accordance with an optional feature of the invention, the quality circuit is arranged to determine the quality metric to comprise a first quality metric for the first view images and a second quality metric for the second view images.

This may provide particularly advantageous evaluation in many embodiments and may specifically allow differentiation between effects resulting from the depth estimation and effects not caused by non-ideal depth estimation.

In accordance with an optional feature of the invention, the quality circuit is arranged to determine quality metrics for a plurality of camera configurations, and to select between the plurality of camera configurations in response to both the first quality metric and the second quality metric.

The approach may provide a particularly advantageous approach for evaluating and selecting between different camera configurations.

In accordance with an optional feature of the invention, the quality circuit is arranged to select a camera configuration between the plurality of camera configurations in response to at least: the first quality metric meeting a first criterion; the second quality metric meeting a second criterion; and a difference measure for the first quality metric and the second quality metric meeting a third criterion.

This may provide particularly advantageous performance in many embodiments.

In accordance with an optional feature of the invention, the quality circuit is arranged to generate a signal to noise measure for each second view image, and to generate the quality metric in response to the signal to noise measures for the second view images.

This may provide a particularly advantageous approach for determining the quality metric. In particular, it has been realized that the signal to noise measure may be particularly advantageous for evaluating the impact of camera configurations and associated processing.

The signal to noise ratio may specifically be a peak signal to noise ratio.

In some embodiments, the quality circuit may be arranged to generate a signal to noise measure for each first view image, and generate the quality metric in response to the signal to noise measures for the first view images.

In other embodiments other measures than the signal to noise measure or peak signal to noise measure may be used, such as for example Video Multimethod Assessment Fusion measures.

In accordance with an optional feature of the invention, the processing of at least one of the first synthesizing circuit and the second synthesizing circuit includes encoding and decoding of the virtual captured images prior to image synthesis based on encoded and decoded virtual captured images.

The approach may provide a particularly advantageous evaluation including simultaneously considering both the effects of camera configurations and of encoding/decoding algorithms.

Encoding and decoding may include e.g. frame/video encoding/decoding and may include a range of operations such as image or depth down-scaling, and packing together image and depth in a single texture (image), bitstream formatting, etc.

In accordance with an optional feature of the invention, the processing of at least one of the first synthesizing circuit and the second synthesizing circuit includes encoding and decoding of at least one of the depth data and the estimated depth data associated with the virtual captured images prior to image synthesis based on the at least one of the model depth data and the estimated depth data.

The approach may provide a particularly advantageous evaluation including simultaneously considering both the effects of camera configurations and of encoding/decoding algorithms.

In accordance with an optional feature of the invention, the encoding comprises lossy encoding.

In accordance with an optional feature of the invention, at least some camera poses are the same as at least some test poses.

In accordance with an optional feature of the invention, there are no less than 10 times more test poses than camera poses.

In accordance with an optional feature of the invention, the camera positions form a one dimensional arrangement whereas the test positions form a two dimensional or three dimensional arrangement.

In accordance with an optional feature of the invention, a maximum distance between two test positions is no more than 1 meter.

In some embodiments, a maximum distance between two test positions is no more than 10 meters.

In some embodiments, a maximum distance between two test positions is no less than 10 meters.

According to an aspect of the invention there is provided a method of evaluating a quality for image capture, the method comprising: storing a model of a scene; generating virtual captured images for a plurality of camera poses of a camera configuration by rendering images for the camera poses based on the model; generating model depth data for the virtual captured images from the model; processing the virtual captured images based on the model depth data to generate first view images for a plurality of test poses in a region of the scene; generating estimated depth data for the virtual captured images based on the virtual captured images; processing the virtual captured images based on the estimated depth data to generate second view images for the plurality of test poses; generating reference images for the plurality of test poses by rendering images for the plurality of test poses based on the model; generating a quality metric for at least one of the camera configuration, the processing to generate the first view images, and the processing to generate the second view images in response to a comparison of the first view images, the second view images, and the reference images.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
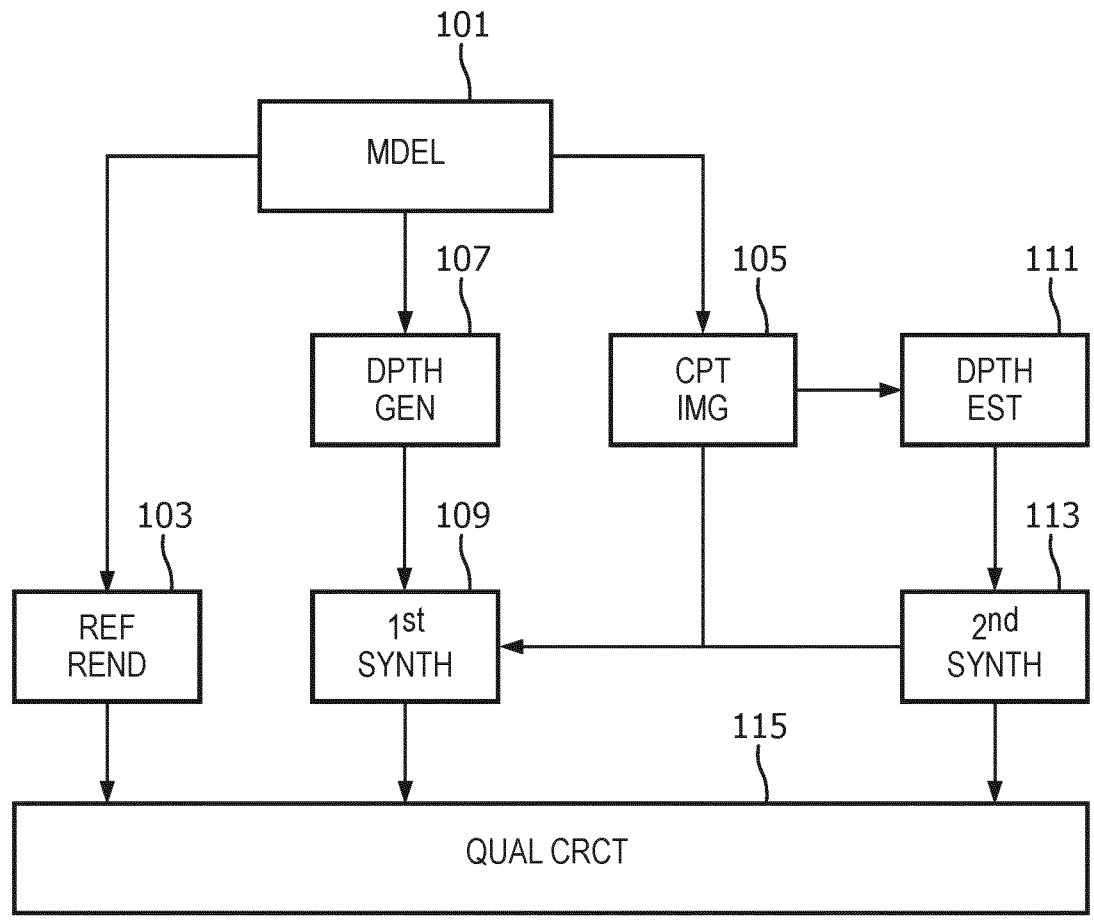
FIG. 1 illustrates an example of elements of an apparatus for evaluating a quality for image capture of a scene by a plurality of cameras.

FIG. 1 illustrates an example of elements of an apparatus for evaluating a quality of image capturing of a scene by a plurality of cameras. The apparatus may specifically determine a quality metric for the capturing of images and the processing of these captured images in order to synthesize images from other viewpoints. The apparatus is based on evaluating a model of a scene with respect to the specific camera configuration and/or the processing of captured images of the scene.

The apparatus comprises a model store 101 which stores a model of a scene. The scene may be a virtual scene representing a real scene or may be a fully artificially created scene. However, an advantage of the approach is that the scene may be selected or created to closely correspond to a scene in which the capture camera configuration and processing is to be used. For example, the virtual scene may be selected to correspond to a soccer stadium if the system for which the evaluation is performed is intended to be used for capturing a football match in the system. As another example, a virtual scene of a concert hall may be used if the quality assessment is for an application capturing a concert in this concert hall. In some scenarios, a more generic scene may be considered. For example, if the system under investigation is intended for capturing landscapes, a generic, typical virtual landscape scene may be captured. In some cases, a model may be generated from a real scene, and thus the scene represented by the model may be a virtual or a real scene.

The model of the scene may be any three dimensional model which allows view images and depths for positions within the scene/model to be determined. Typically, the model may be represented by three dimensional objects, object properties (e.g. optical properties), and light sources. As another example, the model may consist of multiple meshes with associated textures. Properties such as albedo may be attached to the surface of objects. The view images may be formed from the model using advanced ray-tracing methods that accounts for physics such as object transparency, and multiple scattering.

Based on the model, the apparatus may synthesize images for a plurality of test poses in a region of the scene using a variety of approaches as will be described in the following. The results of the different approaches may then be compared, and quality metrics may be determined based on this comparison.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Figure 2:
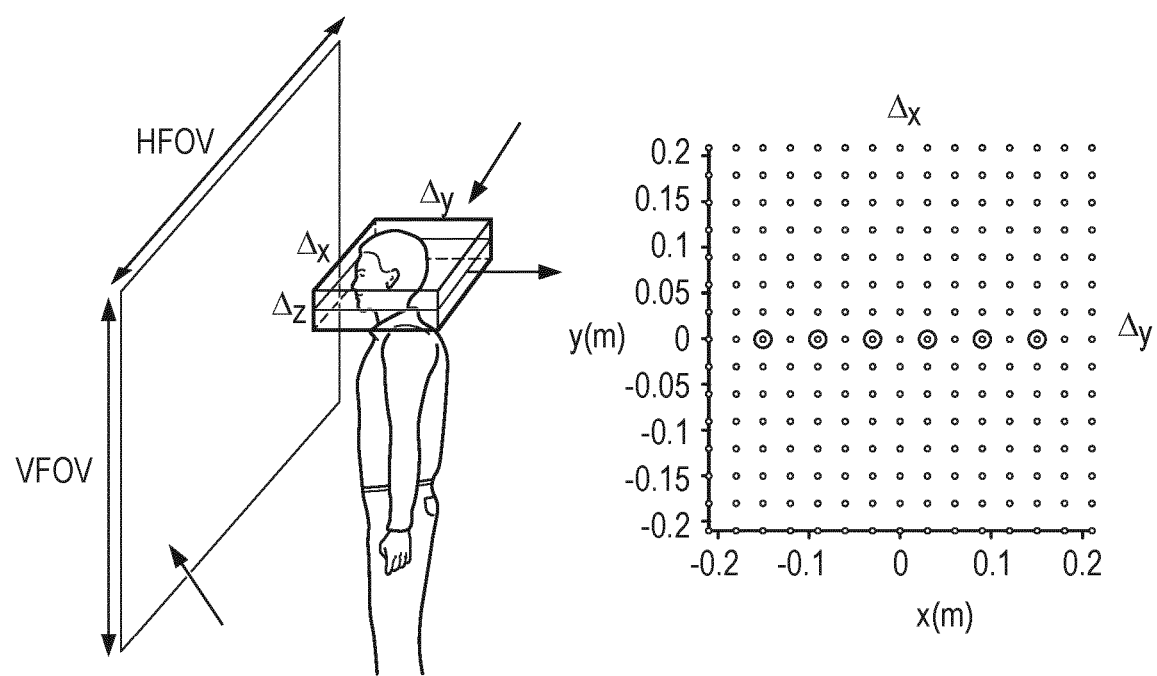
FIG. 2 illustrates an example of a viewing region of test poses for the apparatus of FIG. 1.

The test poses and the region covered by these may be selected depending on the specific application/system being evaluated. In many embodiments, the test poses may be selected to cover a relatively small region. Specifically, in many embodiments, the test poses may be selected to have a maximum distance between any two test poses of not more than 1 meter. For example, as illustrated in FIG. 2, a relatively large number of test poses may be selected as a regular horizontal grid within a region of (roughly) 0.5 m by 0.5 m. In the example shown, the number of test poses is 15 by 15 (i.e. 225 poses) with a grid distance of 3 cm. It will be appreciated that more or less test poses may be used in different embodiments depending on the preferred trade-off between the desired accuracy and the computational complexity. However, in many embodiments, it is advantageous to have no less than 50, 100, 200 or 5000 test poses in order to provide a high degree of accuracy for a suitable computational complexity.

The example of using a large number of test poses within a small region may in particularly provide highly accurate results for an application where captured images are used to provide a viewer with some limited freedom of movement, e.g. where the user is not able to move around freely in a scene but is able to move slightly or turn his head from a nominal position. Such applications are increasingly popular and provides many desirable applications, such as e.g. viewing sports events from designated positions.

In other embodiments, the scene may be desired to be viewed from positions that differ more, for example it may be desired that the user can move further around in the scene, or that an event can be viewed from different positions. In such embodiments, test poses may be selected which cover a larger area/region.

The determination of the quality metric is based on a capture/camera configuration, i.e. the quality metric can be determined for a specific camera configuration. The camera configuration comprises one or typically more camera poses from which a camera can capture an image of the scene. The camera poses of the camera configuration thus represents the poses for capture of the scene and the evaluation and the quality metric may be used to determine how suitable the specific camera configuration is for capturing the scene. The camera configuration may also be referred to as a capture configuration.

Thus, the model and camera configuration can accordingly represent the actual scene and camera poses that may be used in a setup to capture the scene.

In many applications, the camera configuration comprises a relatively low number of cameras, and indeed the number of camera poses is typically no more than 15, 10, or 5 cameras.

Thus, typically, the number of test poses is substantially higher than the number of camera poses, and typically no less than ten times as high. This may often provide an accurate, exhaustive, and advantageous determination of the quality metric for the system.

In some embodiments, a large number of capture cameras may be considered. For example, for a a soccer stadium the number of cameras could easily run into hundreds depending on the type of fly-around motion that is desired. However, even in such embodiments, there may be a (potentially substantially) larger number of test poses used for evaluation.

Further, as in the example of FIG. 2, the camera poses/positions of the capture cameras may often coincide with test poses/positions (at least for some of the cameras). This may provide a practical approach and e.g. reduce some computational complexity. In addition, having coinciding capture poses and test poses may provide a basic test that algorithms work correctly since MSE=0 and hence the PSNR is not defined (it includes division by).

In many embodiments, the camera configuration comprises camera positions that form a one-dimensional arrangement, and which often corresponds to a linear arrangement of capture cameras. This is often highly practical and many practical camera rigs are arranged in a linear arrangement. In such embodiments, the positions of the test poses are often arranged in a two dimensional or three dimensional arrangement. The test poses may thus reflect not only the impact that result from sideways view shifts but also from shifts in other directions, thereby reflecting the more typical user behavior.

A specific example is shown in FIG. 2, where six in-line camera poses align with six out of the 225 test poses (indicated by rings around the test poses). The test poses are arranged around the camera poses thereby allowing determination of how movements from a nominal, central position may affect quality.

The model store 101 is coupled to a reference circuit 103 which is arranged to generate reference images for the plurality of test poses by rendering images for the test poses based on the model.

The reference circuit 103 is arranged to generate the reference images by directly evaluating the model and rendering the images. Thus, the rendering of the reference images is independent of the captured images or the camera configuration. The rendering depends directly on the model and on the particular test pose. It will be appreciated that different rendering algorithms may be used in different embodiments. However, in many embodiments, the rendering of the reference images is by ray tracing techniques based on the stored model.

As a specific example, the rendering may use commercially available packages such as Unity, Unreal and Blender (open source) that have been developed to create photorealistic games and film content. Such advanced packages typically may not only provide photorealistic images but also allows output other data, such as e.g. depth.

The reference images are thus based only on the model and the test poses, and can typically be generated with very high accuracy as the rendering does not require any assumptions or potentially noisy or distorting processes. Accordingly, the reference images may be considered to provide accurate representations of the view from the specific test poses.

The model is further coupled to a capture circuit 105 which is arranged to generate virtual captured images for the camera poses of the camera configuration. The capture circuit 105 thus renders virtual captured images that reflect the view from the camera poses, and thus the images that would be captured by cameras positioned at those poses.

It should be noted that the capture cameras may in some cases for instance comprise wide angle fish-eye lenses. When ray-tracing such cameras, a wide angle image and depth with visual distortions will result. This makes these images different from the test image that may predict a more limited viewport that a given human eye receives.

The rendering algorithm used to render the virtual captured images is based on the model and may specifically be the same algorithm used by the reference circuit 103 to render images for the test poses. Indeed, in examples where the camera poses coincide with some of the test poses, the same rendering may be used to generate both reference images for those poses and virtual camera images for the camera poses.

Thus, the captured images correspond to images that would be captured by cameras at the poses of the camera configuration for the given model/scene.

The model store 101 is further coupled to a depth generation circuit 107 which is arranged to generate model depth data for the captured images. The model depth data is generated from the model and is not based on the captured images or the content thereof. The model depth data may specifically be arranged by determining the distance in the model from each pixel of the captured images to the closest object represented by the image. The model depth data may thus be generated by evaluating the geometric properties of the model, and may e.g. be determined as part of a ray tracing algorithm that generates the captured images.

The model depth data thus represents the actual depth in the model for the contents of the captured images and as such may be considered ground truth depth data, i.e. it may be considered to be highly accurate depth data.

The depth generation circuit 107 and the capture circuit 105 are coupled to a first synthesis circuit 109 which is arranged to perform processing of the virtual captured images based on the model depth data to generate first view images for the plurality of test poses in a region of the scene.

Thus, the first synthesis circuit 109 may comprise functionality for synthesizing view images for the plurality of test poses based on the captured images and the model depth data, i.e. based on the ground truth depth data. The synthesis may include view shifting etc. as will be known to the skilled person.

Further, although in some embodiments, the first synthesis circuit 109 may only include the synthesis operation, in many embodiments, the processing may further include a number of functions or operations that are part of the processing or distribution path for the evaluated application/system. For example, as will be described in more detail later, the processing may include encoding, decoding, compression, decompression, view selection, communication error introduction, etc.

The first synthesis circuit 109 may thus generate images that can be synthesized based on the captured images and assuming ground truth depth. The resulting image may thus reflect the impact of the processing as well as of the specific capture configuration.

The model store 101 is further coupled to a depth estimation circuit 111 which is arranged to generate estimated depth data for the virtual captured images based on the virtual captured images. Thus, in contrast to the depth generation circuit 107 which determines the depth based on the model itself, the depth estimation circuit 111 determines depth data based on the captured images.

Specifically, the depth estimation circuit 111 may perform depth estimation based on the techniques for depth estimation to be used in the application/system being evaluated. For example, depth estimation may be performed by detecting corresponding image objects in the different captured images and determining the disparity between these. The depth estimates may be given by such disparities.

The estimated depth data may thus represent the depth estimates that would be generated by the actual application and processing and thus will reflect imperfections, errors, and artefacts that would be introduced by this depth estimation. The estimated depth data may be considered to be less accurate than the model depth data but may be a better estimate of the depth that would actually be determined and used in the evaluated application/system.

The depth estimation circuit 111 and the capture circuit 105 are coupled to a second synthesis circuit 113 which is arranged to perform processing of the virtual captured images based on the estimated depth data to generate second view images for the plurality of test poses.

Thus, the second synthesis circuit 113 may comprise functionality for synthesizing view images for the plurality of test poses based on the captured images and the estimated depth data, i.e. based on the expected depth data generated by the evaluated application. The synthesis may include view shifting etc. as will be known to the skilled person.

Further, although in some embodiments, the second synthesis circuit 113 may, as the first synthesis circuit 109, only include the synthesis operation, in many embodiments, the processing may further include a number of functions or operations that are part of the processing or distribution path for the evaluated application/system, such as encoding, decoding, compression, decompression, view selection, communication error introduction, etc.

The second synthesis circuit 113 may thus generate images that can be synthesized based on the captured images themselves. The resulting image may reflect the impact of the processing as well as of the specific capture configuration. In addition, the second view images may reflect the impact of non-ideal depth estimation and may directly reflect the images that are expected to be generated for the end user in the application and system under evaluation.

The reference circuit 103, first synthesis circuit 109, and the second synthesis circuit 113 are coupled to a quality circuit 115 which is arranged to generate a first quality metric in response to a comparison of the first view images, the second view images, and the reference images.

The quality metric may specifically be determined to reflect how similar the different images are. Specifically, in many embodiments the quality metric may reflect an increasing quality for a decreasing difference between the first view images, the second view images, and the reference images (for the same test poses and in accordance with any suitable difference measure or metric).

The quality metric may reflect both properties of the camera configuration as well as the characteristics of the processing performed (for both the first and second view images). Thus, a quality metric may be generated to reflect the impact of at least one of the camera configuration, the processing to generate the first view images, and the processing to generate the second view images. Typically, the metric may be generated to reflect all of these.

The apparatus may thus provide a highly efficient and accurate approach for evaluating a quality impact of different camera configurations and/or different processing without requiring complex, expensive, and/or difficult tests and captures to be performed.

The approach may provide a particularly advantageous evaluation, and in particular the consideration of both view images generated based on ground truth data and on actual estimated data may provide particularly advantageous information. This is further exacerbated by the comparison to reference images that do not rely on any capture. For example, it is possible to evaluate not only how large the quality impact is of a specific approach by comparing this to the reference images, but it is in addition possible to determine if significant improvement can be achieved by improving the depth estimation. The impact of depth estimation imperfections and/or their dependence on the capture configuration is traditionally very complex to evaluate and differentiate, and the current approach may provide a highly efficient and useful evaluation that is otherwise very difficult.

In particular, the ability to detect for, a given capture configuration, whether the depth estimation or the view shifting (causing occlusions) is lower quality is useful. For instance, in case both the ground truth and the estimated depth result in inferior quality, then either the capture configuration needs more cameras or the view shifting is too simple and needs to either include more references (to deal with occlusions), or a more sophisticated prediction method is needed.

It will be appreciated that different quality metrics, and algorithms and procedures for determining such metrics, may be used in different embodiments depending on the specific preferences and requirements of the individual embodiment. Specifically, the quality metric determination may be dependent on the exact camera configuration and the processing of the image and depth data, including the specific depth estimation and image synthesis approaches used.

In many embodiments, the reference images may be considered to be "correct" images and two quality metrics may be generated by comparing respectively the first view images and the second view images to the "ideal" reference images. A part quality metric may be determined for each view image based on the difference between this and the reference image for the same test pose. The part quality metrics may then be combined, e.g. summed or averaged, to provide a quality metric for each of respectively the set of first view images and the set of second view images. The quality metric may be generated to comprise the two quality metrics (thus the quality metric may comprise a plurality of components). In many embodiments, the quality circuit 115 may be arranged to generate a signal to noise measure for each view image of the set of first view images and the quality metric may be generated in response to these signal to noise measures for the first view images. For example, the signal to noise measures may be combined into a single measure, e.g. by averaging the signal to noise measures.

Similarly, in many embodiments, the quality circuit may be arranged to generate a signal to noise measure for each view image of the set of second view images and the quality metric may be generated in response to these signal to noise measures for the second view images. For example, the signal to noise measures may be combined into a single measure, e.g. by averaging the signal to noise measures.

As a specific example, a peak signal-to-noise ratio (PSNR) may be used, such as e.g.

$$PSNR \equiv 10 \cdot \log_{10}\left(\frac{255^2}{MSE}\right),$$

where MSE is the mean squared error over the RGB color channels of the view images. While the PSNR may not be considered as an optimal metric to evaluate absolute video quality in all circumstances, the inventor has realized that it is particularly useful for comparisons and evaluation in the system of FIG. 1 where it is useful to provide a reference basis within a single dataset.

The processing performed by the first synthesis circuit 109 and the second synthesis circuit 113 may as previously described simply consist in a view synthesis operation that based on the captured images and associated depth data (respectively ground truth and estimated depth data) synthesizes view images for other poses using suitable viewpoint shifting algorithms. Such an approach may for example generate a quality metric that may provide a reasonable evaluation of the quality impact of the specific camera configuration being evaluated. It may for example be used in a process where a plurality of camera configurations are evaluated to determine a suitable camera configuration to use for capturing a real world scene.

However, in many embodiments, the system may include an evaluation of other aspects such as the specific processing of the distribution and processing from the capturing of images to the rendering of images.

Figure 3:
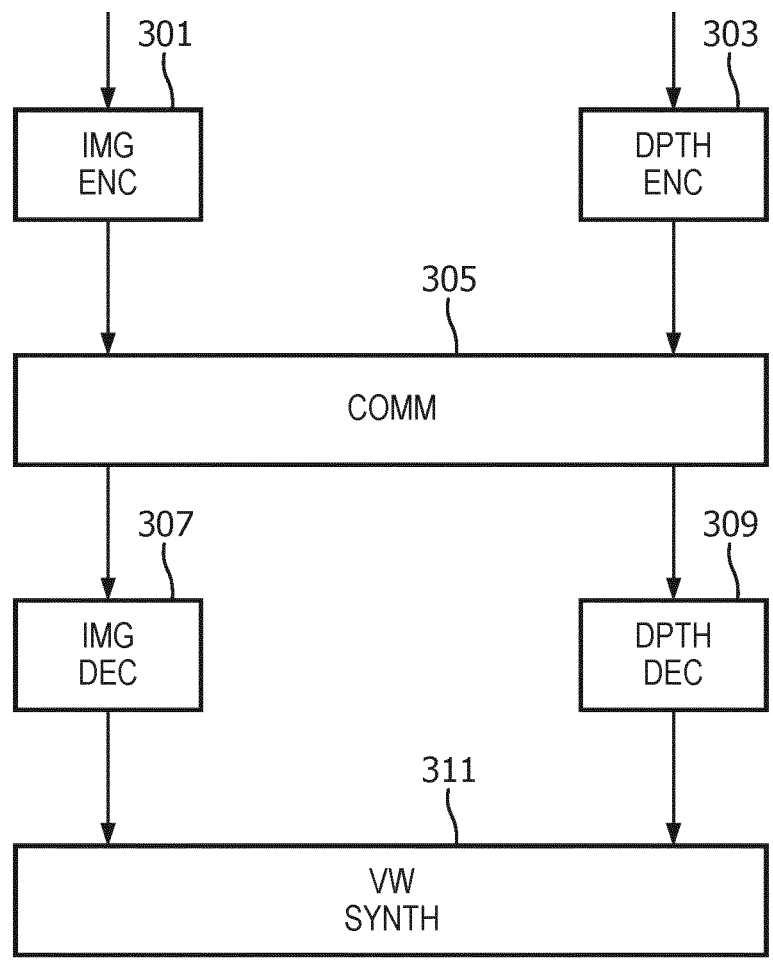
FIG. 3 illustrates an example of processing functions that may be emulated by the second synthesis circuit and/or first synthesis circuit of the apparatus of FIG. 1.

FIG. 3 illustrates an example of the processing that may be included in the processing of the first synthesis circuit 109 and the second synthesis circuit 113.

In the example, the captured images are fed to an image encoding function 301 and the depth data is fed to a depth encoding function 303 which perform encoding of respectively the captured images and the associated depth data. The encoding performed by the first synthesis circuit 109 and the second synthesis circuit 113 may specifically be exactly the same as the encoding algorithm that is used in the system being evaluated.

Significantly, the encoding performed on the captured image data and on the depth data may be a lossy encoding where information contained in the captured images and/or depth is lost when being encoded into a suitable data stream. Thus, in many embodiments, the encoding of the image/depth data also includes a compression of the image/depth data. The impact of, specifically lossy, encoding and compression is typically very difficult to evaluate as it interacts with other effects and processing and thus the resulting impact often depends on other features than the encoding itself. However, the apparatus of FIG. 1 allows such effects to be evaluated and considered.

It should be appreciated that the encoding may include any aspect of converting images/frames/depth into a bitstream for distribution and that decoding may include any processing or operation required to recover the images/frames/depth from the bitstream. For example, encoding and decoding may include a range of operations including image or depth down-scaling, packing of image and depth together in a single texture (image), bitstream formatting, compression etc. The exact operations that will be evaluated and implemented by the first synthesis circuit 109 and the second synthesis circuit 113 will depend on the preferences and requirements of the specific embodiment.

In a typical distribution system, the encoded data may be communicated, typically in a single data stream comprising both the encoded captured image data as well as the depth data. The first synthesis circuit 109 and/or the second synthesis circuit 113 may accordingly also include processing to reflect this communication. This may be achieved by a communication function 305 which e.g. may introduce latency and/or communication errors. The first synthesis circuit 109 and/or second synthesis circuit 113 may further include decoding functions 307, 309 for respectively the captured image data and the depth data. These decoding functions 307, 309 may accordingly correspond to the decoding performed at the client/receiving end of the distribution system being evaluated. They may typically be complementary to the encoding performed by the encoders 301, 303.

The decoded image data and depth data is then used by an image synthesizer which is arranged to synthesize the images for the test poses.

Thus, the processing of the first synthesis circuit 109 and the second synthesis circuit 113 may not only include the image synthesis itself but may also include some or indeed all aspects of the communication/distribution from the capturing of the images by cameras to the presentation of views for the test poses. Furthermore, the processing may match that used in the real world system being evaluated and indeed the exact same algorithm, procedures, and indeed code may be used. Accordingly, the apparatus may not only provide an efficient means of evaluating a camera configuration but further allows accurate evaluation of potentially all processing and functionality involved in the distribution and processing to generate view images.

A particular advantage of the approach is that it can be adapted to include exactly the functions and features that are considered relevant and appropriate. Further, the processing can include the exact same algorithms and functions as used in the system under evaluation, and thus the approach may provide an accurate indication of the quality that can be achieved in the system.

It will be appreciated that many variations and algorithms for encoding, decoding, communicating, and in general processing images and depth are known and that any suitable approaches may be used. It will also be appreciated that in other embodiments, more or fewer functions may be included in the processing by the first synthesis circuit 109 and/or the second synthesis circuit 113. For example, the processing may include functionality for selecting between different capture images when performing view synthesis, or image manipulation (e.g. spatial filtering) may be applied prior to encoding, sharpness processing may be performed after decoding etc.

It will also be appreciated that whereas FIG. 3 shows essentially the same processing to be applied to the captured image data and the depth data, this is not necessary or essential and may depend on the specific embodiment. For example, if depth data is in the form of a depth map, functions similar to the image data processing may often be used whereas if the depth data is e.g. represented by a 3D mesh, there may be substantial differences in the processing of depth and image data.

Similarly, in most embodiments, the processing by the first synthesis circuit 109 and the second synthesis circuit 113 is substantially the same, or possibly even identical. In many embodiments, the only difference is that one synthesis circuit uses ground truth depth data whereas the other uses estimated depth data. However, it will be appreciated that in other embodiments, there may be differences in the processing by the first synthesis circuit 109 and the second synthesis circuit 113. This may for example be done to reduce the computational burden or may e.g. reflect a scenario where the ground truth depth data and the estimated depth data are provided in different formats.

A particular advantage of the approach is that it can be easily adapted to different representations of depth and different processes for handling depth when e.g. synthesizing new views.

In particular, in some embodiments, at least one of the ground truth depth data and the estimated depth data may be represented by a depth map model which specifically may be a depth map for each captured image. Such depth maps may often be encoded and decoded using algorithms that are also used for image data.

In such embodiments, the image synthesis function performed by the first synthesis circuit 109 and second synthesis circuit 113 may perform view shifting of the virtual capture image to a test pose using the depth map model. Specifically, pixels of the captured images may be shifted by an amount that depends on the depth/disparity indicated for that pixel in the image. This may result in holes in the generated images when de-occlusion occurs. Such holes may e.g. be populated by infilling or interpolation as known to the skilled person.

Using a depth map model may be advantageous in many systems, and the apparatus of FIG. 1 may be adapted to accurately reflect such processing.

In other embodiments, other depth data may be employed and other image synthesis algorithms may be used.

For example, in many embodiments, depth may be represented by a single 3D model that is generated from multiple capture images. The 3D model may for example be represented by a plurality of 3D points in space. A color may be determined for each of the 3D points by combining multiple captured images. Since the 3D point model lives in world-space, any view can be synthesized from it. One approach for instance is to project each 3D point according to a test pose and form an image. This process will use point projection, keeping depth order and mapping the color that corresponds to a given 3D point to the projected pixel location in a given test pose virtual camera image. Keeping depth order will make sure that only visible surfaces are present in the image. So called splatting can be used to weigh the contribution of points when they cover part of a target pixel.

As for the other variations and options, the apparatus of FIG. 1 may also easily be adapted to such an approach, and may provide particularly attractive evaluation of such approaches. In many embodiments, such a complex approach can be evaluated together with the rest of the processing simply by including the same code/algorithm in the processing by the first synthesis circuit 109 and/or second synthesis circuit 113.

The approach may as previously mentioned allow an accurate and reliable evaluation of the quality that can be achieved for a given camera configuration and processing. The approach allows quality assessments to be made for a camera configuration (or a range of camera configurations) without requiring any complex physical setup and measurement. In addition, the system can provide quality assessment of the various functions involved in the processing, distribution, and synthesis of captured images to generate view images. Indeed, the apparatus may provide an advantageous quality assessment of camera configurations, of image/depth processing (including e.g. communication), or both.

The apparatus may in particular be used to select between different possible camera configurations. It would be cumbersome and expensive to perform dedicated physical measurements and tests to select between different camera configurations, but the apparatus of FIG. 1 allows an accurate quality evaluation that can be used to compare between the different camera configurations.

In other embodiments, a specific camera configuration may be used, and the apparatus may e.g. be used to compare different algorithms or parameter settings for one or more of the processing steps including in the processing by the first synthesis circuit 109 and/or the second synthesis circuit 113. For example, when selecting between two alternative depth estimating techniques, the apparatus of FIG. 1 can be used to determine a quality metric for both depth estimation techniques and the best one can be selected.

A significant advantage of this is that the specific feature being evaluated can be evaluated based on a number of aspects of the system. For example, a simple comparison of the capture images or of the depth estimation in itself is likely to result in relatively inaccurate evaluation as it does not include for example the interaction between different functions.

The use of three types of synthesized images, namely reference images generated with no consideration of the captured images, first view images generated considering true depth, and second view images generated considered estimated depth is particularly advantageous in many embodiments.

Specifically, the system being evaluated based on a model of a scene allows a very accurate baseline for assessing the view images synthesized from the captured images. The reference images provide a reliable reference for what may be considered the "correct" images or views from the test poses. The comparison to such reference images may thus provide highly trustworthy and accurate indications of how closely the view images match what would actually be seen/captured from the test poses.

Further, generating synthesized view images based on both ground truth depth data and estimated depth data provides additional information that is particularly advantageous in assessing the quality impact. Of course, it may in particular be useful to assess the quality, and quality impact, of the depth estimation algorithm used. It may thus be highly advantageous for selecting between different depth estimation algorithms.

However, the advantageousness of the consideration of the two types of depth data may also provide advantageous information for evaluating other elements of the processing or the camera configuration. For example, multiple cameras typically mean too many pixels and too high a bitrate. Hence image/depth packing and compression is often needed. To determine whether image/depth packing and compression dominate the error performance or not, the packing and compression can be left out entirely in order to provide a clear comparison.

Indeed, even if perfect depth is available for one or more nearby captured images, it is still not possible to perfectly synthesize an image for a different viewpoint. Obvious reasons for this include occlusion artefacts and illumination changes (both effects increase when the angle with the reference views increases). This type of error or degradation may be referred to as modelling error or view synthesis error.

Depth estimation adds another uncertainty and indeed errors may be very large at some positions and in fact the entire synthesis may potentially break down due to depth estimation errors.

Determining quality metrics, such as PSNR, for both ground truth and estimated depth allows a better judgement of how to update the camera configuration and also whether or not the maximum quality has been achieved. E.g. if the PSNR using the ground truth depth is not substantially better than the PSNR for estimated depth, it may not be useful to add further capture poses or physical cameras.

The approach may as previously mentioned be used to select between different camera configurations. For example, a range of possible camera configurations may be considered, and a quality metric may be determined by the apparatus of FIG. 1 for all possible camera configurations. The camera configuration for which the best trade-off between the complexity of the camera configuration (e.g. represented by the number of cameras) and the resulting quality is achieved may be selected.

In many embodiments, the quality metric generated by the apparatus of FIG. 1 may as previously mentioned include both a first quality metric reflecting how closely the first view images match the reference images and a second quality metric reflecting how closely the second view images match the reference images.

In many such embodiments, the selection of a given camera configuration may be subject to both the first and the second quality metric meeting a criterion. For example, the criterion may require that both quality metrics are above a threshold, i.e. that the differences between the view images and the reference images are below a threshold.

However, in addition, it may also be required for the first quality metric and the second quality metric to be sufficiently close to each other, i.e. it may be required that the difference between these is below a given threshold. This requirement may provide an additional consideration in that the depth is estimated sufficiently accurately giving trust that depth related estimation errors will less likely cause quality problems when deploying the given capture configuration in practice As a specific example, the apparatus may be used to select between different possible camera configurations. The camera configurations may be evaluated individually and sequentially in order of their preferred status. For example, the camera configurations may be evaluated in order of their complexity, e.g. if the camera configurations correspond to a linear arrangement of respectively 3, 5, 7, 9 cameras, the apparatus may first evaluate the 3-camera camera configuration, followed by the 5-camera camera configuration, followed by the 7-camera camera configuration, and lastly followed by the 9-camera camera configuration. The apparatus may evaluate these camera configurations in order until a camera configuration is determined for which the first quality metric meets a first criterion (e.g. it being above a threshold), the second quality metric meets a second criterion (e.g. it being above a threshold); and a difference measure for the first quality metric and the second quality metric meeting a third criterion, specifically that the difference measure is below a threshold.

This selection criterion may be particularly advantageous since the first and second quality metrics each indicate that the synthesis quality is sufficient and since the difference is small we have trust that depth estimation does not break down since it results in similar synthesis results as when using ground truth.

In some embodiments, the difference between the first quality metric and the second quality metric may be indirectly calculated by a determination of a PSNR (or other suitable signal to noise ratio) between the first and second (synthesized) view images. This may provide advantageous additional information. For example, if the PSNR of both the first and the second view images are high when compared to the reference images but low when compared to each other, then there is less trust in that particular configuration/depth estimation algorithm compared to the case that the PSNR between the first and second view images is also low.

The approach may specifically use computer graphics (CG) models and image simulation to compare different camera capture configurations and/or image processing for the purpose of 6DoF (Degrees of Freedom) video capture. Given a predefined viewing region and a set of sampling positions/test poses, a single (possibly composite) quality metric may be calculated for each capture configuration and these quality metrics may be used to select the best camera configuration thereby e.g. avoiding the need to actually build and test each system in order to evaluate the performance.

Competing methods for 6DoF video capture/creation and compression are often compared visually, and, in the case of compression, also quantitatively. However, the quality is often more determined by the type of camera sensors, their spatial configuration (e.g. spacing) and camera parameters. Comparing such capture configurations is often costly since it involves costly equipment and creating labor intensive setups. The present approach and the apparatus of FIG. 1 may address these issues.

Specifically, in order to compare two or more potential capture configurations (and/or processing approaches), a CG scene that is suitable for the application (e.g. a soccer field) may be used and represented by the model. A set of sample test poses (typically on a grid) may then be defined within the boundaries of a pre-set 6DoF viewing region. Virtual captured images in the form of e.g. photo realistic images can be rendered for each camera pose and for each capture configuration to be evaluated. The necessary processing (e.g. depth estimation and compression) is then applied to the rendered captured images using both estimated depth data and ground truth data. As a next step, view images are predicted/synthesized for the set of test poses in the 6DoF viewing region. The results may be compared to the reference images and for each capture configuration, a single quality metric (such as the maximum prediction error over all samples) can be calculated. Finally, the quality metrics of all capture configurations can be compared and the configuration with the smallest error may be selected.

The approach may in particular allow reduced cost when evaluating different camera configurations and associated processing. In the approach, the performance of a system can be evaluated without requiring buying and installing expensive camera equipment e.g. around a sports stadium. Rather evaluation may be based on e.g. a realistic CG soccer model (including the field and the players). Ray-traced images may also be used for estimating depth thereby allowing the computational quality to be kept reasonably low.

In the following, a specific example will be described in more detail. The apparatus of FIG. 1 may in this example specifically provide a quality evaluation approach that uses ray-traced images of virtual scenes to simulate the acquisition for a given camera capture configuration. The images are passed to real-time depth estimation and view-synthesis software. Views are then synthesized for test poses of a pre-set viewing zone and the resulting images are compared with the ray-traced images (the reference images). Modelling errors may be isolated from depth estimation errors by comparing both the images synthesized from ground truth depth and images synthesized from estimated depth with the ray-traced images.

Producing live 6DoF video requires video capture with multiple cameras, real-time depth estimation, compression, streaming and playback. All of these components are under development and a ready-made solution is hard to find. To make the right choices during development there is a desire to be able to predict in advance the effect that system parameters (e.g. baseline distance between cameras) and depth estimation algorithms have on image quality. The apparatus of FIG. 1 may in this specific example address such issues and provide an efficient quality evaluation approach.

The example is based on a practical evaluation using a model supported by Blender which is a graphics rendering engine that is commonly used for film creation and game development. In the example, the Python interface (e.g. for version 2.79) is used to create ray traced images for cameras located in a regular grid of 15×15 anchors with a spacing of 3 cm. The resulting viewing zone allows an observer to move his/her head back-to-front and left-to-right (see FIG. 2). In particular, the viewing zone for a standing person allows limited head motion parallax. The quality of view synthesis from a given set of capture camera poses is evaluated on a uniform grid of test poses Python is used to automate the Blender raytracing of the 15×15 images to generate the reference images for the test poses as well as the captured images. A sample spacing of 3 cm is in the specific example used in both the x- and y-direction for the test poses. One of the key parameters to pre-investigate for the design of a capture rig is the camera spacing (baseline). Using ray traced images to generate the captured images allows the finding of an optimal baseline for a given minimum quality level within the intended viewing zone. As representative scenes, the specific approach was analyzed considering the capture of a person scene (henceforth referred to as Human) that was constructed using MakeHuman software, and a car scene (henceforth referred to as Car) which was based on a Blender demo files.

To compare performance and system parameters with a simple measure, a peak signal-to-noise ratio is used:

$$PSNR \equiv 10 \cdot \log_{10}\left(\frac{255^2}{MSE}\right),$$

where MSE is the mean squared error over RGB colour channels. In addition, synthesized view images based on estimated depth were visually compared to synthesized images generated using ground truth generated images.

Figure 4:
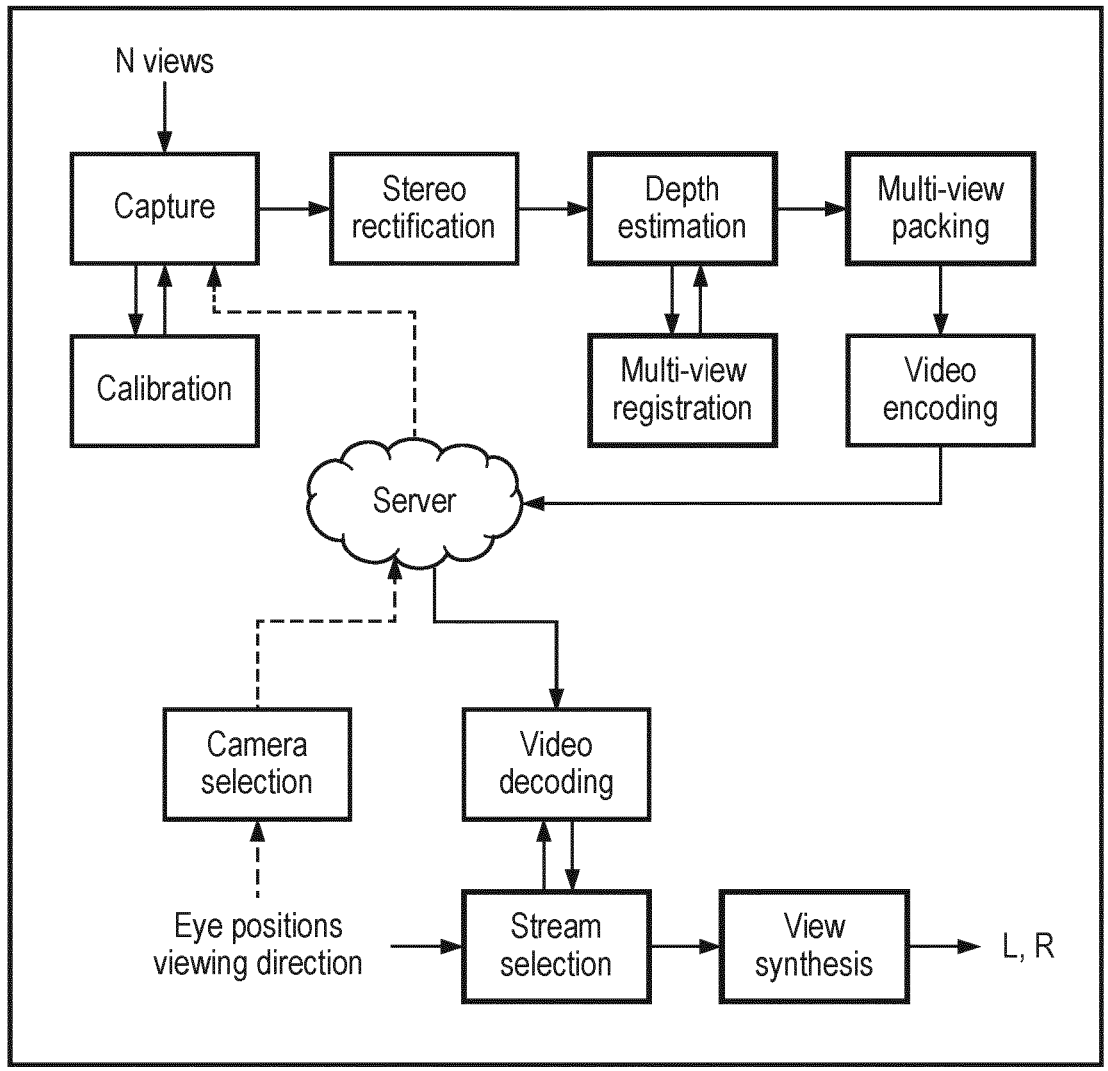
FIG. 4 illustrates an example of processing functions that may be emulated by the second synthesis circuit and/or first synthesis circuit of the apparatus of FIG. 1.

The example is based on evaluating a system as shown in FIG. 4 with the associated processing being implemented by the first synthesis circuit 109 and the second synthesis circuit 113.

FIG. 4 shows the algorithm blocks from capture to rendering on the client device. For a live broadcast case, depth estimation and multi-view registration may include calibration of intrinsic and extrinsic parameters for pairs or cameras followed by a multi-camera pose refinement step. Specifically, the process may include disparity estimation followed by a classifier that determines the probability that the estimated disparity is correct or wrong. The processing may be implemented on a GPU to achieve real-time performance at 30 Hz. A temporal bilateral filter may ensure that the depth maps vary smoothly as a function of time such that depth errors are at least temporally not disturbing.

Figure 5:
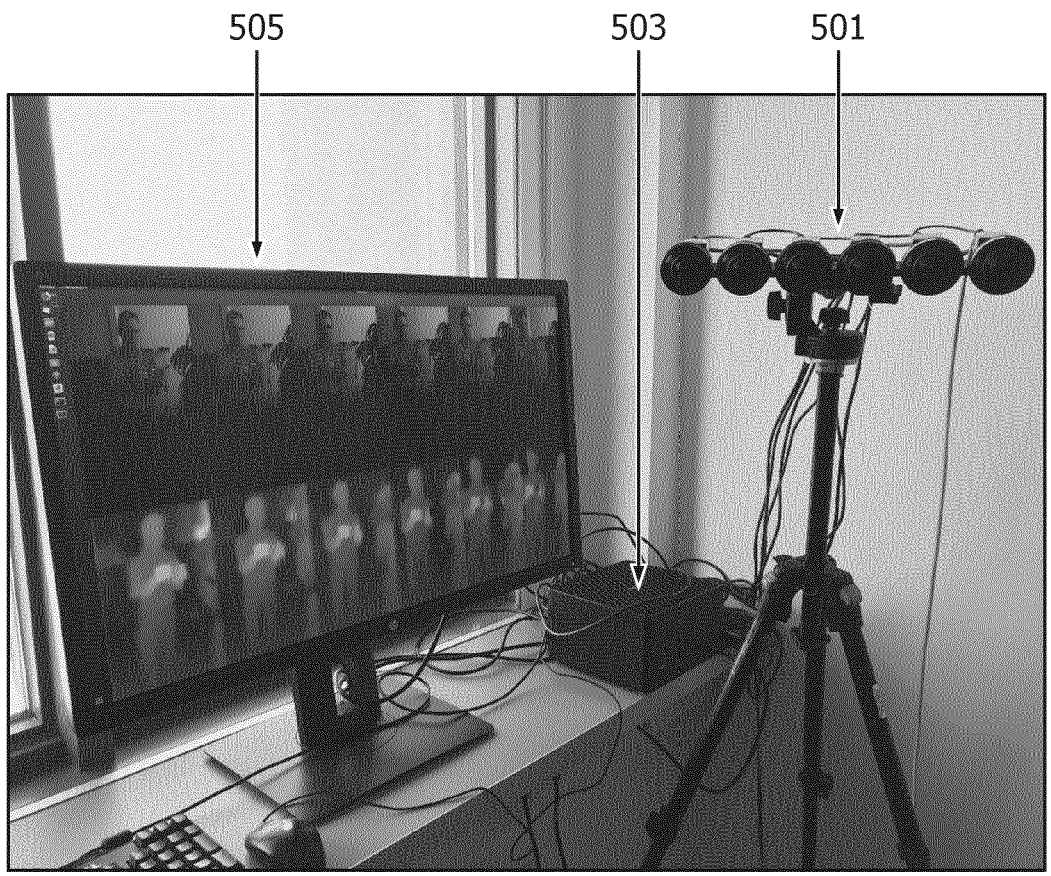
FIG. 5 illustrates an example of an experimental setup for capturing and rendering a scene.

FIG. 5 shows an example of an experimental setup including a capture rig 501 with a camera configuration corresponding to six cameras being arranged in a row, a processing unit 503, and a display 505. The system processes 6-camera feeds of 640×1080 resolution, calculates 6 depth maps, packs 6 images and 6 depth maps together in a single 4K video frame, and encodes this, all in real-time at 30 fps. Such a system thus forms a scalable low-cost (consumer hardware) solution for live-streaming: Depending on the target resolution, two, four or six cameras may be attached to a single PC and the output of each PC can stream to a common server. Frame synchronization of the multiple videos is dealt with at the capture side. The 4K output of each PC is encoded using the encoder chip that is present on the graphics card. The system can output normal H.264 or HEVC video or can directly produce HLS/MPEG-DASH video fragments to allow adaptive streaming.

At the client side, views are received as packed video and decoded using the platform specific hardware decoder. After decoding follows unpacking where the needed reference captured views and depth maps are extracted from the packed frame. The depth maps are converted to a mesh using a vertex shader.

Figure 6:
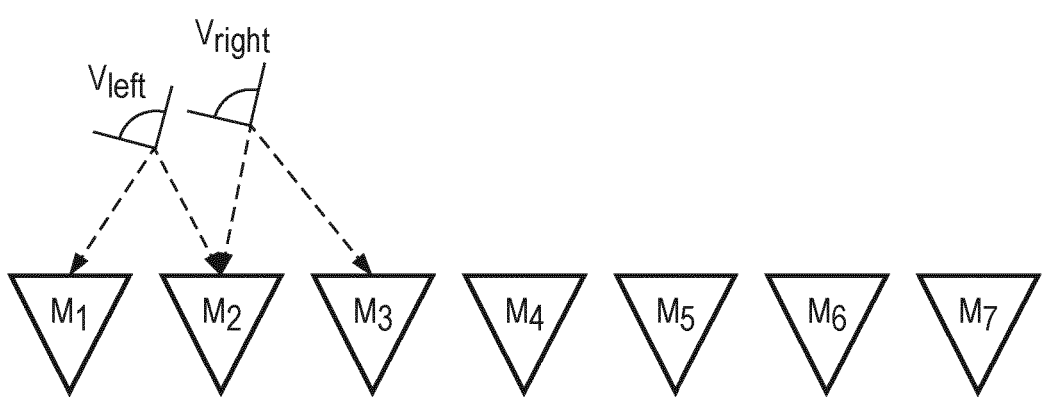
FIG. 6 illustrates an example of selecting captured images by the apparatus of FIG. 1.

Stream selection runs at the client device to select a subset of the streams corresponding to the capture poses that are used to generate views for a specific pose, see FIG. 6. For example, it can be assumed that the client has model matrices $M_i$ of the reference views i available as metadata. Stream selection selects the two nearest reference viewpoints using the 4×4 view matrices $V_{left}$ and $V_{right}$ for each eye. The nearest viewpoint is calculated using:

$$i_{nearest} = \arg\min_i \left( |M_i p - Vp| \right),$$

where $M_i$ is the model matrix for view i, homogeneous coordinate $p=(0,0,01)^t$ and V is the view matrix of either the left or the right eye.

This basically corresponds to an approach where for each eye, the nearest captured images (typically two) with associated depth information is used to predict the eye image. The absolute value symbol converts a vector to a scalar distance in 3D space. Matrix V describes the position and orientation of the eye and matrix M describes the position and orientation of each reference view. Argmin i just denotes that the minimum distance is taken over all reference cameras.

In the example, the processing and view synthesis may be based on 3D meshes. Specifically, at initialization, a fixed size regular triangular mesh is created. Via sampling of the depth map, the vertex shader converts each vertex of the mesh directly to a clip-space homogenous output position:

$$p = PV_{eye} M_i Q_i \begin{bmatrix} u \\ v \\ D_i(u, v) \\ 1 \end{bmatrix},$$

where $D_i(u, v)$ is the disparity derived from the depth map at input texture coordinates u, v), $Q_i$ is the disparity to depth matrix and $PV_{eye}M_i$ is the product of model, view and projection matrix for a given eye. For the specific example, a simple fragment shader may be used, but it can in principle be used to do more advanced occlusion handling and/or blending for improved image quality. Both the nearest and the second nearest reference view may be blended together to predict the final image. This allows in principle for a scalable solution to 6DoF video where only a limited sub-set of potentially very many views are streamed to the user while he/she is moving. Blending may for example only depend on the proximity of reference views:

$$I_{eye} = \frac{|x_2|}{|x_1| + |x_2|} I_1 + \frac{|x_1|}{|x_1| + |x_2|} I_2,$$

where $x_1$ and $x_2$ are the distances along the x-axis to the nearest and second nearest captured views/images. This simple blending equation represents a trade-off between perceptually smooth transitions between views and slightly less accuracy of view synthesis in occlusion regions.

Figure 7:
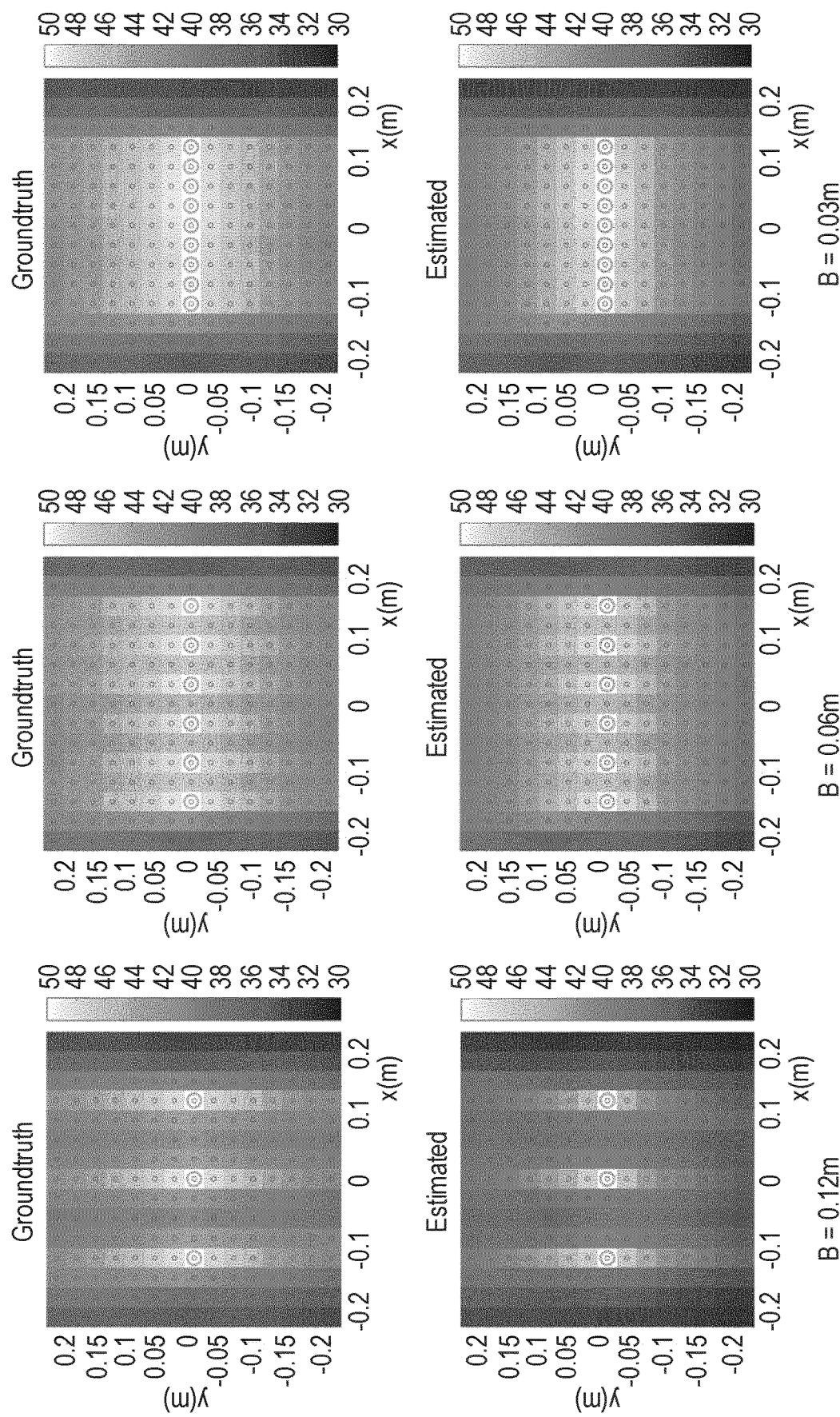
FIG. 7 illustrates an example of quality measures determined by the apparatus of FIG. 1.
Figure 8:
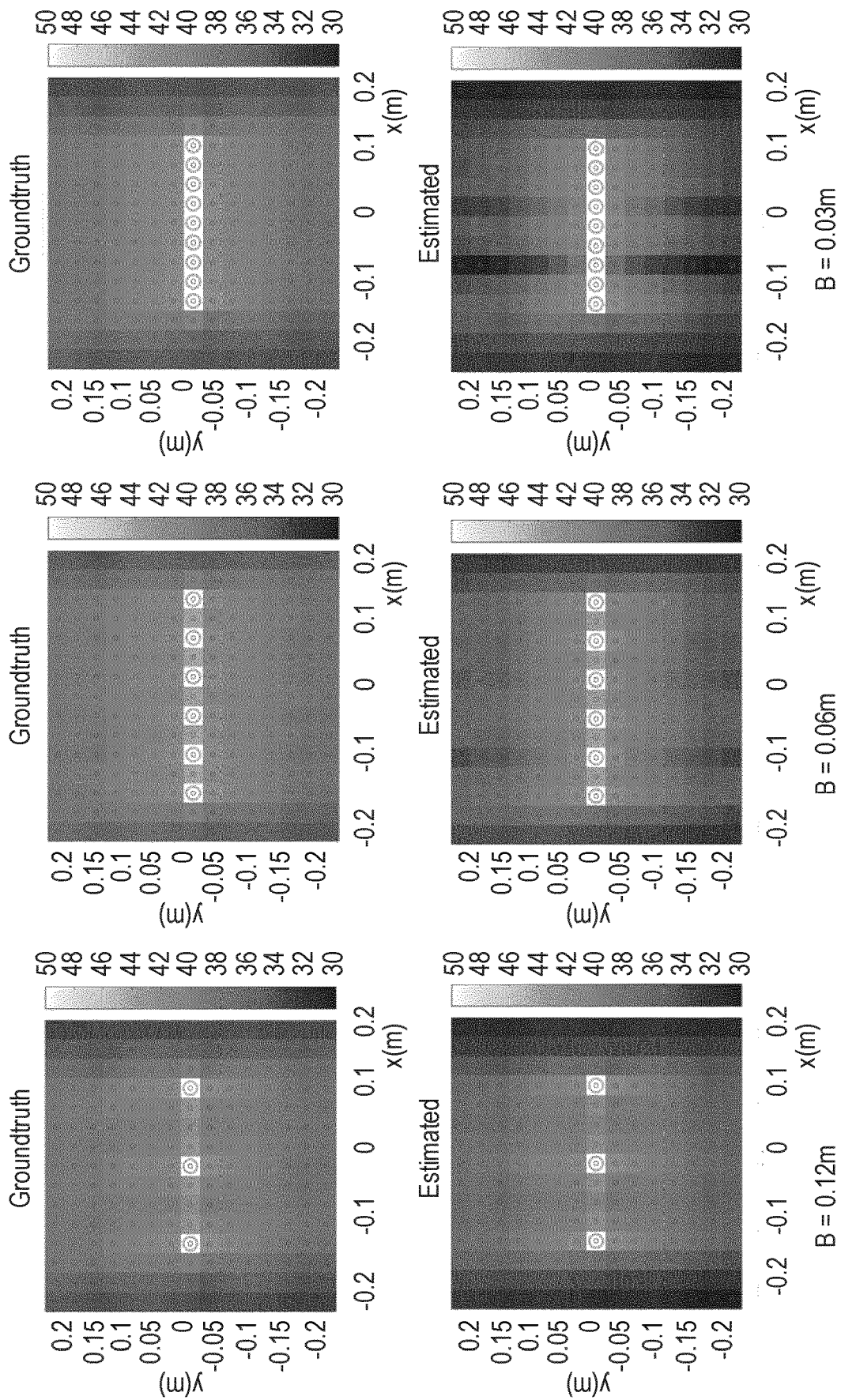
FIG. 8 illustrates an example of quality measures determined by the apparatus of FIG. 1.

For the example, FIGS. 7 and 8 show PSNR variations in the viewing zone for three different camera baselines (12 cm, 6 cm and 3 cm distance between camera capture poses).

FIG. 7 shows PSNR [dB] for the scene Human inside the viewing zone on a scale from 30-50 dB for varying camera baseline using ground truth disparity (top row) compared with estimated disparity/depth (bottom row). The circles indicate the camera positions.

FIG. 8 shows PSNR [dB] for the scene Car inside the viewing zone on a scale from 30-50 dB for varying camera baseline using ground truth disparity (top row) compared with estimated disparity/depth (bottom row). The circles indicate the camera positions. Thus, the top row of each figure is produced with ground truth depth maps while the bottom row is produced using estimated depth maps. Ground truth depth and estimated depth result in a similar pattern: the smaller the baseline, the higher the PSNR in the viewing zone. The following table summarizes results for the two scenes where the minimum PSNR over a 24×24 cm region is reported.

|  | Human | | | Car | | |
| --- | --- | --- | --- | --- | --- | --- |
|  | B = 0.12 m | B = 0.06 m | B = 0.03 m | B = 0.12 m | B = 0.06 m | B = 0.03 m |
| Ground Truth Depth | 39.5 | 42.7 | 43.7 | 38.4 | 39.0 | 38.9 |
| Estimated Depth | 37.0 | 41.6 | 41.9 | 37.2 | 36.2 | 31.7 |

It can be seen that PSNR values are systematically lower for the Car scene when compared to the Human scene. This is due to the transparent objects (windows) in the car for which the model of having a single depth value per pixel is clearly too simple. For the Car scene, the depth estimator can fail for shiny and/or transparent object parts.

Figure 9:
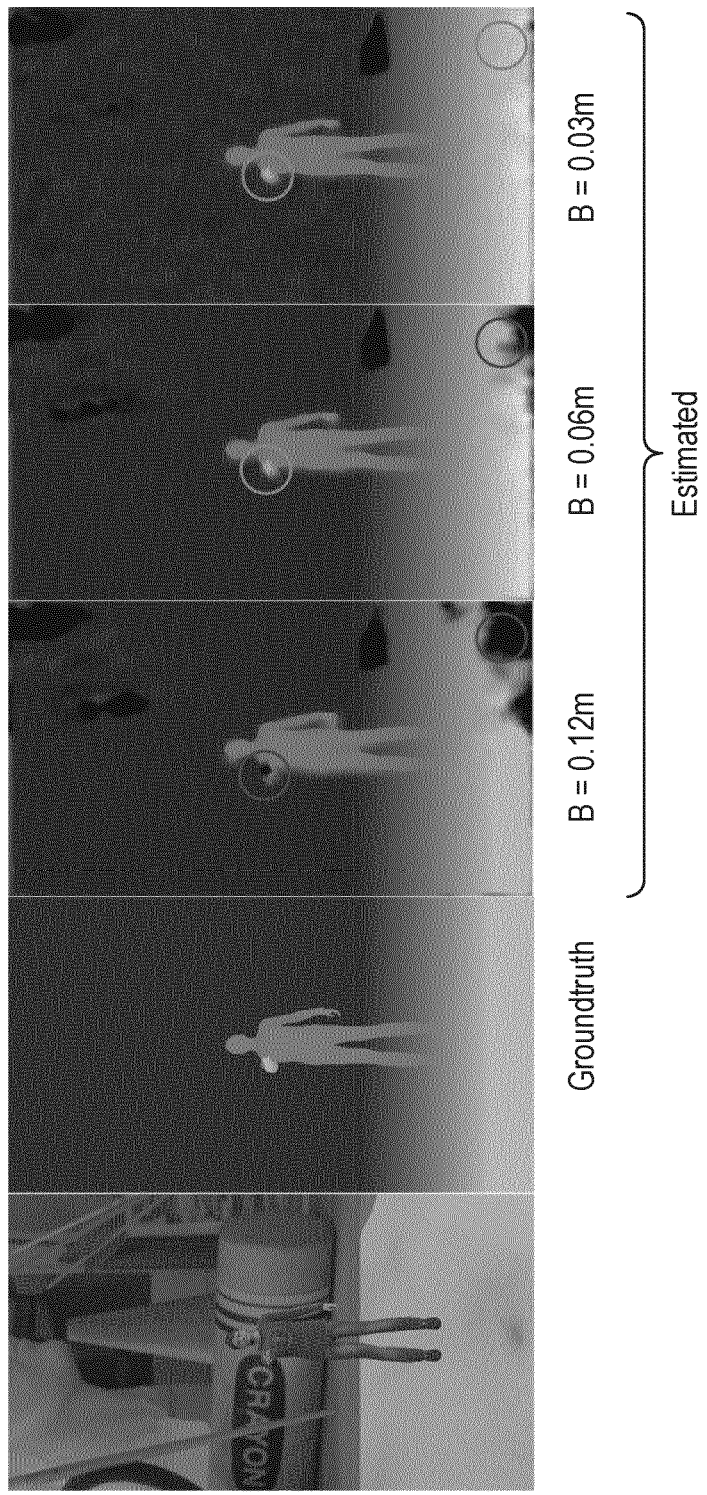
FIG. 9 illustrates an example of depth maps determined based on different camera configurations by the apparatus of FIG. 1.

The approach allows direct comparison of ground truth depth with estimated depth. FIG. 9 shows such a comparison for Human. FIG. 9 illustrates ground truth versus estimated disparity/depth for different camera baselines. To produce the estimated images, a scaling was applied to compensate for baseline difference. Errors at a larger baseline disappear at a smaller baseline.

Figure 10:
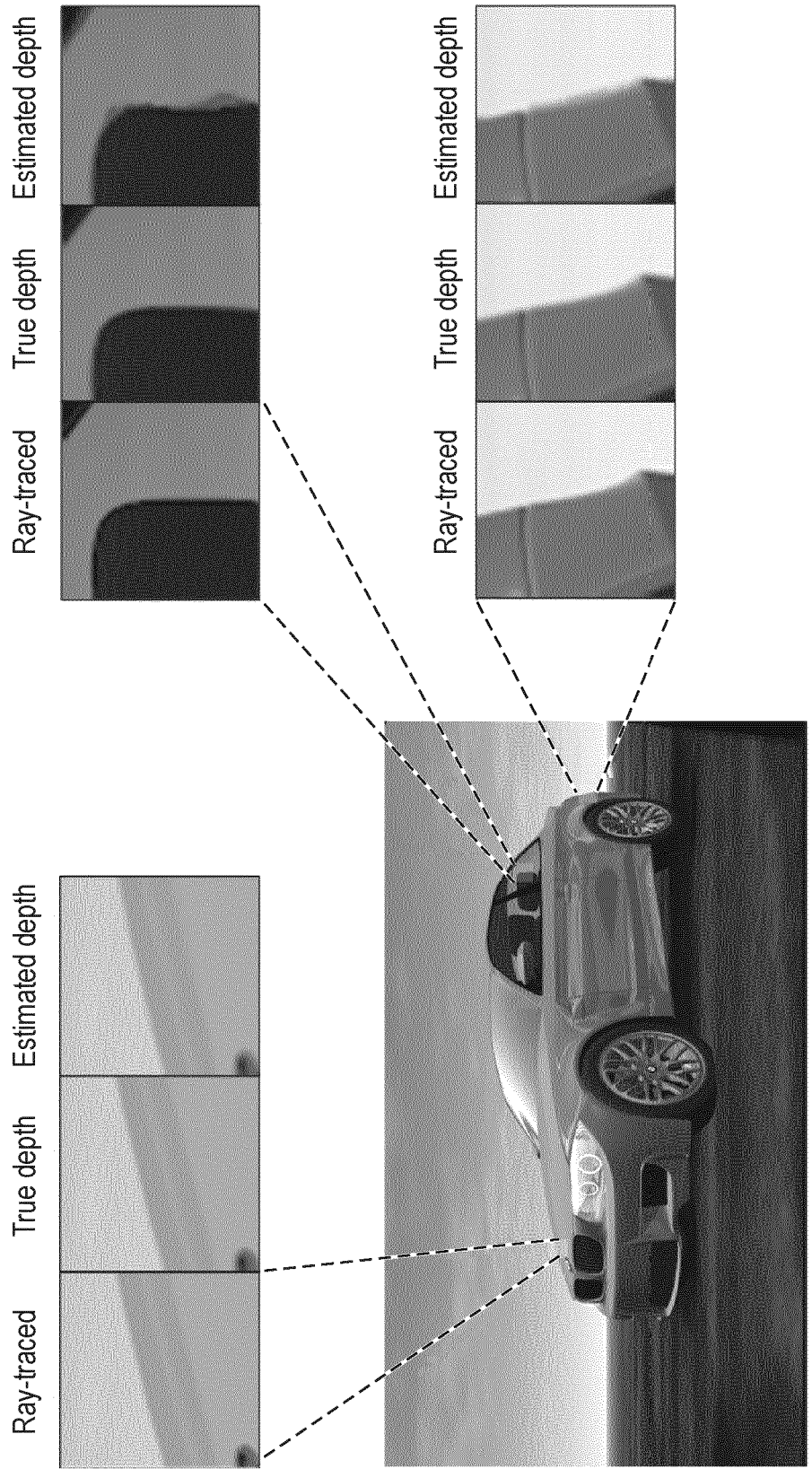
FIG. 10 illustrates an example of details of view images generated by the apparatus of FIG. 1.

It can be seen that a smaller baseline results in fewer disparity estimation errors. This is understandable since synthesis occurs from captured views at smaller spatial distance and occlusion/illumination differences are smaller for smaller baselines. Since ray-traced ground truth images are available, a visual comparison can be made between ray-traced images for the test poses (the reference images), synthesized images based on ground truth, and synthesized images based on depth estimation. FIG. 10 shows such a comparison for the Car scene and specifically shows a visual comparison between ray-traced reference images, view images synthesized using ground truth depth, and view images synthesized using estimated depth (B=0.03 m) for images for different locations in the viewing zone, i.e. for different reference poses.

It can be seen that there are hardly any visible differences between ray-traced images (reference images) and synthesized images when using ground-truth depth. When using estimated depth, some image blurring results.

The apparatus of the example may allow a simulation approach based on e.g. ray-traced images to predict the quality of e.g. a 6DoF video broadcast system. Errors or degradations may occur due to e.g. camera spacing, real-time depth estimation and view synthesis and the described approach may evaluate all of these.

The approach allows a separation/isolation of modelling errors from estimation errors, which is useful when trying to improve depth estimation and view synthesis. The approach may be used for the design of more complex (360 degree) capture rigs or potentially very large camera arrays.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:
   a memory circuit,
      wherein the memory circuit is arranged to store a model of a scene;
   a capture circuit,
      wherein the capture circuit is arranged to generate virtual captured images for a plurality of camera poses of a camera configuration,
      wherein the capture circuit is arranged to generate the virtual captured images by rendering images for the camera poses based on the model;
   a depth generation circuit,
      wherein the depth generation circuit is arranged to generate model depth data for the virtual captured images from the model;
   a first synthesis circuit,
      wherein the first synthesis circuit is arranged to perform a first processing,
      wherein the first processing is arranged to process the virtual captured images based on the model depth data so as to generate first view images for a plurality of test poses in a region of the scene;
   a depth estimation circuit,
      wherein the depth estimation circuit is arranged to generate estimated depth data for the virtual captured images based on the virtual captured images;
   a second synthesis circuit,
      wherein the second synthesis circuit is arranged to perform a second processing,
      wherein the second processing is arranged to process the virtual captured images based on the estimated depth data so as to generate second view images for the plurality of test poses;
   a reference circuit,
      wherein the reference circuit is arranged to generate reference images for the plurality of test poses by rendering images for the plurality of test poses based on the model; and
   a quality circuit,
      wherein the quality circuit is arranged to generate a quality metric for at least one of the camera configuration, the first processing, and the second processing,
      wherein the first processing and the second processing use a comparison of the first view images, the second view images, and the reference images.

2. The apparatus of claim 1,
   wherein at least one of the first processing and the second processing comprises generating a depth map model for a first virtual capture image of the virtual captured images,
   wherein at least one of the first processing and the second processing comprises view shifting the first virtual capture image to a test pose of the plurality of test poses using the depth map model.

3. The apparatus of claim 1,
   wherein at least one of the first processing and the second processing comprises determining a set of 3D points using at least one depth model,
   wherein the depth model is determined from the virtual capture images, wherein at least one of the first processing and the second processing comprises determining a color for each 3D point using at least one virtual capture image of the virtual capture images, wherein at least one of the first processing and the second processing comprises synthesizing a new image for a test pose of the plurality of test poses based on a projection of the 3D points.

4. The apparatus of claim 1, wherein the quality metric comprises a first quality metric for the first view images and a second quality metric for the second view images.

5. The apparatus of claim 4,
wherein the quality circuit is arranged to determine quality metrics for a plurality of camera configurations,
wherein the quality circuit is arranged to select between the plurality of camera configurations in response to both the first quality metric and the second quality metric.

6. The apparatus of claim 5,
wherein the quality circuit is arranged to select a camera configuration between the plurality of camera configurations in response to at least one of the first quality metric meeting a first criterion, the second quality metric meeting a second criterion, and a difference measure for the first quality metric and the second quality metric meeting a third criterion.

7. The apparatus of claim 1,
wherein the quality circuit is arranged to generate a signal to noise measure for each second view image,
wherein the quality circuit is arranged to generate the quality metric in response to the signal to noise measures for the second view images.

8. The apparatus of claim 1, wherein the processing of at least one of the first synthesizing circuit and the second synthesizing circuit comprises encoding and decoding of the virtual captured images prior to image synthesis based on encoded and decoded virtual captured images.

9. The apparatus of claim 1, wherein at least one of the first processing and the second processing comprises encoding and decoding of at least one of the depth data and the estimated depth data associated with the virtual captured images prior to image synthesis based on the at least one of the model depth data and the estimated depth data.

10. The apparatus of claim 8, wherein the encoding comprises lossy encoding.

11. The apparatus of claim 1, wherein at least some camera poses are the same as at least one of the plurality of test poses.

12. The apparatus of claim 1, wherein there are no less than 10 times more test poses than camera poses.

13. The apparatus of claim 1,
wherein the camera positions form a one dimensional arrangement,
wherein the test positions form a two dimensional or three dimensional arrangement.

14. A method of evaluating a quality for image capture, the method comprising:
storing a model of a scene;
generating virtual captured images for a plurality of camera poses of a camera configuration by rendering images for the camera poses based on the model;
generating model depth data for the virtual captured images from the model;
processing the virtual captured images based on the model depth data to generate first view images for a plurality of test poses in a region of the scene;
generating estimated depth data for the virtual captured images based on the virtual captured images;
processing the virtual captured images based on the estimated depth data to generate second view images for the plurality of test poses;
generating reference images for the plurality of test poses by rendering images for the plurality of test poses based on the model;
generating a quality metric for at least one of the camera configuration, the processing to generate the first view images, and the processing to generate the second view images,
wherein the processing to generate the first view images, and the processing to generate the second view images use a comparison of the first view images, the second view images, and the reference images.

15. A computer program stored on a non-transitory medium, wherein the computer program when executed on a processor performs the method as claimed in claim 14.

16. The method of claim 14,
wherein at least one of the processing by the first synthesizing circuit and the second synthesizing circuit comprises generating a depth map model for a first virtual capture image of the virtual captured images,
wherein at least one of the processing by the first synthesizing circuit and the second synthesizing circuit comprises view shifting the first virtual capture image to a test pose of the plurality of test poses using the depth map model.

17. The method of claim 14,
wherein at least one of the processing by the first synthesizing circuit and the second synthesizing circuit comprises determining a set of 3D points using at least one depth model,
wherein the depth model is determined from the virtual capture images,
wherein at least one of the first processing and the second processing comprises determining a color for each 3D point using at least one virtual capture image of the virtual capture images,
wherein at least one of the processing by the first synthesizing circuit and the second synthesizing circuit comprises synthesizing a new image for a test pose of the plurality of test poses based on a projection of the 3D points.

18. The method of claim 14, wherein the quality metric comprises a first quality metric for the first view images and a second quality metric for the second view images.

19. The method of claim 18, further comprising:
determining quality metrics for a plurality of camera configurations; and
selecting between the plurality of camera configurations in response to both the first quality metric and the second quality metric.

20. The method of claim 19, further comprising selecting a camera configuration between the plurality of camera configurations in response to at least one of the first quality metric meeting a first criterion, the second quality metric meeting a second criterion, and a difference measure for the first quality metric and the second quality metric meeting a third criterion.

* * * * *